United States Patent [19]

Cervinka

[11] Patent Number: 4,575,135
[45] Date of Patent: Mar. 11, 1986

[54] SAND-DISPENSING DEVICE FOR MOTOR VEHICLES

[76] Inventor: Franz Cervinka, Oberleitenweg 35, A-6370 Kitzbühel, Austria

[21] Appl. No.: 584,254
[22] PCT Filed: Jun. 8, 1983
[86] PCT No.: PCT/AT83/00017
  § 371 Date: Feb. 1, 1984
  § 102(e) Date: Feb. 1, 1984
[87] PCT Pub. No.: WO83/04397
  PCT Pub. Date: Dec. 22, 1983

[30] Foreign Application Priority Data

Jun. 11, 1982 [AT] Austria .................................. 2267/82

[51] Int. Cl.[4] .................... B60B 39/04; B61C 15/10
[52] U.S. Cl. .................................. 291/20; 291/46; 222/146.5
[58] Field of Search .............. 222/146.2, 146.5; 291/19, 20, 26, 46, 47; 137/341

[56] References Cited

U.S. PATENT DOCUMENTS

| | | | |
|---|---|---|---|
| 1,480,393 | 1/1924 | Johns | 291/20 |
| 1,818,815 | 8/1931 | Rothstein | 291/46 X |
| 1,951,553 | 3/1934 | Martin | 291/20 X |
| 2,182,969 | 12/1939 | Madigan | 291/34 |
| 2,529,197 | 11/1950 | Storberg | 222/146.2 X |
| 3,336,064 | 8/1967 | Dzaack | 291/20 X |
| 4,036,516 | 7/1977 | Oldham | 291/47 X |
| 4,268,016 | 5/1981 | Eschner et al. | 137/341 X |

FOREIGN PATENT DOCUMENTS

| | | | |
|---|---|---|---|
| 147846 | 7/1936 | Fed. Rep. of Germany | 291/46 |
| 577053 | 5/1958 | Italy | 291/20 |
| 193839 | 3/1924 | United Kingdom | 291/20 |

Primary Examiner—Robert B. Reeves
Assistant Examiner—David F. Hubbuch
Attorney, Agent, or Firm—McGlew and Tuttle

[57] ABSTRACT

In a sand-dispensing device for motor vehicles there is provided a refillable sand container, a sand channel with a sand outlet closable by a flap that opens downwards, and a heating system in the contact area of the flap at the sand outlet. This comprises an electrical heating wire that is provided in the contact area such as in the walls of the sand outlet or in the flap and/or in a gasket between the flap and the sand outlet. The heating system helps prevent the flap freezing shut on account of road spray, snow and cold, and thus preserves the functional capability of the sanding system.

6 Claims, 5 Drawing Figures

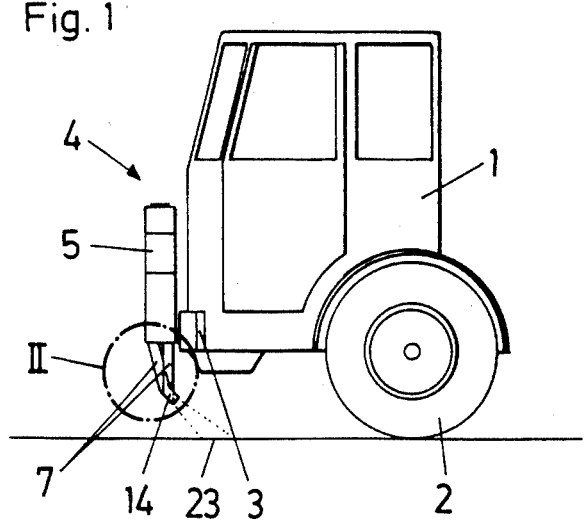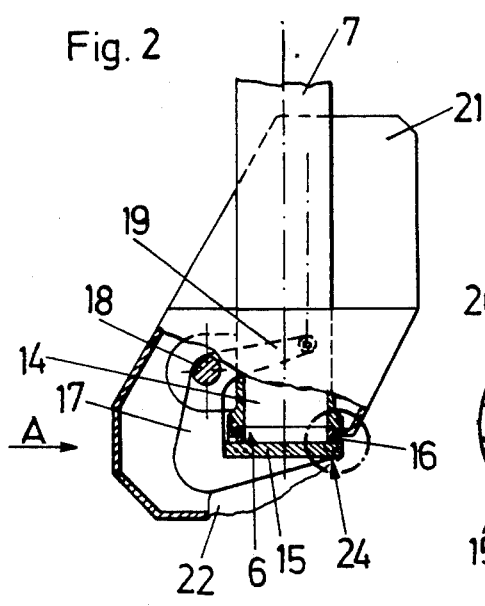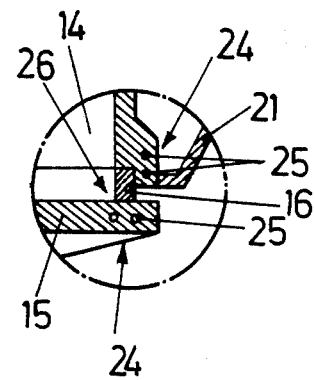

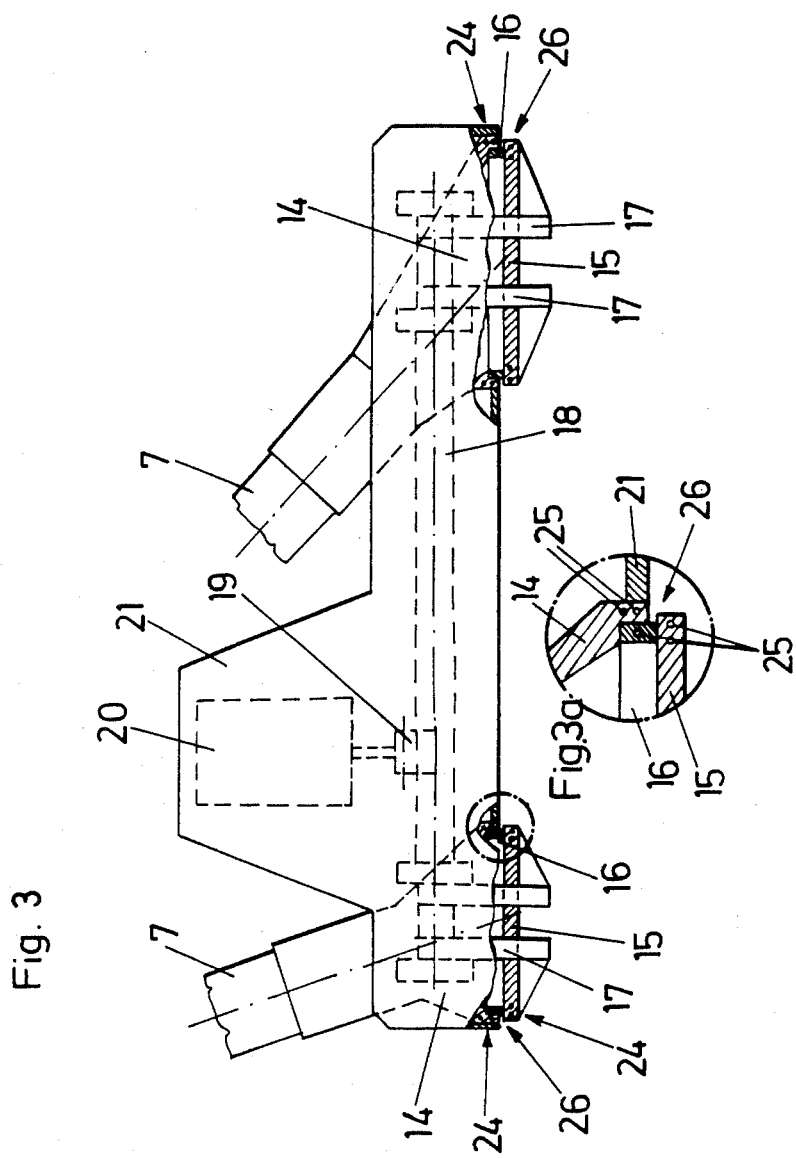

SAND-DISPENSING DEVICE FOR MOTOR VEHICLES

BACKGROUND OF THE INVENTION

FIELD OF THE INVENTION

The invention relates to a sand-dispensing device for motor vehicles, having at least one refillable sand container, from which a sand channel leads to the area in front of one of the vehicle's wheels, and there forms a sand outlet, having a flap that closes the outlet from below, and which has a heating system in the area of the outlet.

Sanding systems are already known for railroad rolling stock and for motor vehicles and serve to increase traction between the wheel and the track, or the roadway, respectively. It is also known that heating systems can be used in order to prevent the sand from freezing in the colder seasons of the year.

A sanding system described in German unexamined patent application No. 1 530 025 is intended for railroad vehicles that are powered by internal combustion engines. In this regard, the exhaust gases from the internal combustion engine are so routed that they flow around the outlet pipe of the sanding system. The sanding systems described in U.S. Pat. No. 1,204,665 and in U.S. Pat. No. 1,292,353 are also intended for railroad vehicles; in these systems a portion of the sand channel is heated, in one case electrically and in the other by steam a portion of the sand channel that is to be heated is wound around with a heating wire; here, however, the sand channel is configured as a double-walled pipe. However, sanding systems used on railroad vehicles can only be compared to a limited extent to motor vehicles, since they are exclusively stationary systems that are always available, even in the warmer times of the year, primarily for emergency braking. Furthermore, most of them are operated by compressed air, which is usually available in railroad vehicles. In contrast to this, sanding systems for motor vehicles are intended for use in the colder periods of the year and their sanding channels and outlets are exposed to road spray, as when the vehicle passes through puddles and the like. For this reason, motor vehicle sanding systems are seldom needed, and when they are used, unfavorable conditions exist that can affect operational safety and traffic safety. Since, in the case of motor vehicles, it is not enough to heat a small portion of the sand channel near the outlet, even through compressed air may be used, because the ingress of road spray can cause icing of the sand channel in any portion throughout its entire length, it has been proposed in Austrian patent AT No. 353,621 that the whole length of the sand channel, including the outlet area, be heated.

From U.S. Pat. No. 2,182,969 and Austrian Pat. No. 198,146 it is also known that the exhaust gases from the engine can be routed to the sand container or the outlet, respectively, in order to provide for heating the sand. In this connection, the inner bottom is movable, so that it can be moved by the pressure of the exhaust gases that pulse in time with the exhaust strokes of the engine. However, such sanding systems do not have individual sanding channels that deliver sand directly ahead of the vehicle wheel, but rather scatter the sand by opening a flap in the container outlet through the oscillating container bottom.

In order to provide the necessary protection against road spray, the arrangement and configuration of flaps, slides and the like at the end of a sanding channel in motor vehicles is also known (see German unexamined patent application No. 2 400 378, U.S. Pat. No. 1,818,815 and Austrian Pat. No. 176,454 and No. 349,328). The arrangement or configuration of flaps naturally provides good protection for the sand channel and the sand outlet against road spray, although this simply displaces the problem of icing from the sand channel to the closing flap whose trouble-free operation must be ensured at any time.

SUMMARY OF THE INVENTION

The invention aims to provide a sanding device for use in motor vehicles that ensures trouble-free operation under any weather conditions.

According to the invention, this is achieved in that the heating system is arranged in the vicinity of the closure flap facing the sand outlet.

The solution according to the invention protects and covers the sand channel and further ensures proper operation of the device since, because of the protection or covering of the sand outlet on the basis of the heating, at least of the contact area of the flap facing the sand outlet, this flap can be opened at any time. If an electrical heating system is used, in particular one for which the vehicle battery can serve as a power source, this system advantageously comprises heating wires provided in the contact area of the flap. Above all else, a simple embodiment of the invention makes it possible to detach the sanding devices from its location, for example, on the vehicle bumper, in which regard a socket can be provided in the vicinity of the bumper into which the connector cable for the flap heating can be plugged. The heating system can then be switched on by means of a switch on the vehicle instrument panel, and this can preferably be combined with the operating lever that is used to open the flap.

In a preferred embodiment a seal or gasket is used in the contact area of the flap on the sand outlet and the heating system is formed in the gasket. The gasket can be installed, for example, in a groove in the face of the sand outlet and may be of rubber in which a heating wire is embedded. It is, of course, possible for the entire flap to be heated.

A further embodiment of the invention provides that the sand outlet, the flap and the associated operating elements may be arranged in a housing that is open below the opening being covered at least in part by a rubber skirt. The rubber skirt provides particular protection agaist excessive accumulations of snow, ice or mud on the outside of the flap, that could cause the flap joint to seize. When the flap is opened the skirt will be displaced by it so that the sand outlet is free.

The invention will be explained in greater detail below on the basis of the figures of the drawings appended hereto, without being limited thereto.

Accordingly it is an object of the invention to provide an improved dispenser of an abrasive material in the vicinity of the wheels of a vehicle which includes a heating arrangement to ensure that the closure mechanism is operative.

BRIEF DESCRIPTION OF THE DRAWINGS

In the drawings:

FIG. 1 is a side elevational view of a truck cab being provided with a sand-spreading device in accordance with the invention;

FIG. 2 is a partial cross-sectional view of the area II in FIG. 1, to an enlarged scale;

FIG. 2a is a detailed view of a portion of FIG. 2;

FIG. 3 is a view of a sand-spreading device for vehicles with twin rear wheels, as seen in the direction of the A arrow in FIG. 2; and FIG. 3a is a detailed view of a portion of FIG. 3.

DESCRIPTION OF THE PREFERRED EMBODIMENTS

Referring to the drawings in particular the invention embodied therein comprises a device generally designated 4 for spreading an abrasive material such as sand in the vicinity of the wheels 2 of a vehicle 1.

The vehicle 1 illustrated schematically in FIG. 1 has a sand-spreading device 4 installed on the front bumper 3; this device includes a sand container 5, at least one sand outlet channel 7 and at its end a sand outlet 14 that dispenses sand ahead of or behind a wheel 2 of the vehicle 1. The sand outlet 14 is closed off from below by a flap 15, as can be seen from FIGS. 2 and 3. The sand, preferably moved by gravity from the sand container 5, is dispensed onto the roadway 23 as required once the flap 15 has been opened, in order that directional control of the vehicle 1 and its braking capability can be maintained in the event of an unexpected encounter with ice. Since the sand outlet 14 is exposed to a considerable amount of slush, road spray, and slipstream, a heating system is provided, to prevent the flap 15 from being frozen at least for the contact area 26 of the flap 15 on the outlet 14.

The preferred heating system 24 comprises, for example, heating wires 25 that are in the contact area 26 of the flap 15 and are advantageously molded into the flap 15 of plastic material. In the same way heating wires 25 are advantageously molded into the edge areas of the sand outlet 14, which is also of plastic. The heating wires 25 can also be accommodated in grooves, applied to the outer sides of the elements that are to be heated, or otherwise arranged. It is also possible to install the heating wires 25 in a gasket 16, installed between the flap 15 and the sand outlet 14. The heating system 24 will help prevent the flap 15 from being frozen to the sand outlet 14 or the gasket 16 and will also help prevent sand which may lie on the flap 15 from being frozen, so that when the flap 15 is opened by the operating system 17, 18, 19 and 20 sand can fall directly onto the roadway. The sand outlet 14 with the flap 15 and the operating system 17–20 is installed in a housing 21, this housing having an opening in the vicinity of the flap 15. This opening is convered, at least in part, by a rubber skirt 22 or the like, that is shown partially removed in FIG. 2, and forms an additional protection for the flap 15 against road spray. Since the skirt 22 is of flexible material it yields in relation to the opening flap 15, so that the sand can escape unhindered. The flap 15 is secured to two angled arms 17 secured to a pivot shaft 18. An operating arm 19 extends radially from the pivot shaft 18, and a lifting magnet or solenoid 20 is arranged in the housing 21 engages the end of this operating arm 19. Another system, such as a cable or the like, can of course be provided to operate the flap 15. However, operation by means of a lifting magnet 20 permits a simple and dismountable installation of sanding device 4 since only a simple connection to the electrical supply is required, for example, to the vehicle cigarette lighter socket in order to operate the heating system, as well as the flap, etc. It is practical to have an electrical socket installed on the vehicle in the vicinity of the sanding device so that the switches can be permanently installed in the vehicle interior.

The embodiment shown in FIG. 3 illustrates the arrangement of the sand outlet for twin wheels; in this embodiment both the heated flaps 15 are arranged on common pivot shaft 18 and are operable by a lifting magnet 20.

I claim:

1. An abrasive material dispenser for dispensing an abrasive material for the wheels of vehicles, comprising an abrasive material container having an outlet channel terminating in an outlet through which abrasive material is dispensed, a flap for engaging said outlet channel at a contact area of said channel around said opening to close said opening, a crank lever member pivotally mounted to said channel and having one arm portion connected to said flap which is movable upwardly and downwardly relative to said opening with said flap and having an opposite arm, drive means connected to said opposite arm to oscillate said crank lever member and to move said flap between a position engaged with said contact area of said channel to close the opening and a position downwardly spaced from said contact area and away from said opening to open the opening, and heating means arranged in said flap only in the vicinity of the contact area of said channel for heating the contact area to permit movement of said flap from its position engaging the contact area to its position downwardly spaced from the contact area.

2. An abrasive material dispenser according to claim 1, wherein said heating means comprises at least one heating wire extending in said flap near an edge of said flap.

3. An abrasive material dispenser according to claim 2, including a gasket connected between said flap and said contact area of said channel, said heating wire extending in said flap adjacent said gasket, with at least one additional heating wire extending in said channel adjacent said contact area.

4. An abrasive material dispenser according to claim 3, wherein said at least one additional heating wire extends in said gasket.

5. An abrasive material dispenser according to claim 3, including a rubber skirt connected to said channel and enclosing at least a portion of said contact area.

6. An abrasive material dispenser according to claim 3, wherein said channel is laterally elongated and includes an opening at each end on a bottom portion thereof each with a contact area therearound.

* * * * *